US012447640B2

(12) United States Patent
Huang et al.

(10) Patent No.: US 12,447,640 B2
(45) Date of Patent: Oct. 21, 2025

(54) RAZOR

(71) Applicant: GUANGZHOU WEIDI TECHNOLOGY CO., LTD., Guangzhou (CN)

(72) Inventors: Zhijian Huang, Guangzhou (CN); Sanhu Wang, Guangzhou (CN); Baoxian Guo, Guangzhou (CN)

(73) Assignee: GUANGZHOU WEIDI TECHNOLOGY CO., LTD., Guangzhou (CN)

( * ) Notice: Subject to any disclaimer, the term of this patent is extended or adjusted under 35 U.S.C. 154(b) by 294 days.

(21) Appl. No.: 18/127,972

(22) Filed: Mar. 29, 2023

(65) Prior Publication Data

US 2024/0261991 A1 Aug. 8, 2024

(30) Foreign Application Priority Data

Feb. 3, 2023 (CN) ......................... 202320151764.5

(51) Int. Cl.

*B26B 21/18* (2006.01)
*B26B 21/40* (2006.01)
*B26B 21/52* (2006.01)

(52) U.S. Cl.

CPC ........ *B26B 21/185* (2013.01); *B26B 21/4062* (2013.01); *B26B 21/521* (2013.01)

(58) Field of Classification Search

CPC .. B26B 21/185; B26B 21/4062; B26B 21/521
See application file for complete search history.

(56) References Cited

U.S. PATENT DOCUMENTS 1,343,900 A * 6/1920 Brasier .................... B26B 21/18 76/DIG. 8
1,934,148 A * 11/1933 Rogers .................... B26B 21/18 30/68

(Continued)

FOREIGN PATENT DOCUMENTS

CN 204183583 U 3/2015
CN 103180111 B 5/2015

(Continued)

*Primary Examiner* — Omar Flores Sanchez
(74) *Attorney, Agent, or Firm* — Muncy, Geissler, Olds & Lowe, P.C.

(57) ABSTRACT

Provided are a shaving head of a razor with a cover body, a base and a blade. The cover body is provided with a cover plate arranged opposite to the base and partially covering the base, a blade slot is formed between the cover plate and the base. The base has at least a first side and a second side exposing outside the blade slot, in which the first side is provided with at least two first comb teeth, with a first guide slot formed between the two adjacent first comb teeth; the second side is provided with at least two second comb teeth, with a second guide slot formed between the two adjacent second comb teeth; the first comb teeth is longer than the second comb teeth. The blade slot receives the blade which has a first cutting edge facing the first side and a second cutting edge facing the second side. The first cutting edge and the second cutting edge are both exposed outside the blade slot but do not extend beyond the first side or the second side of the base. The technical solution provided by the present application is that through cooperation of the first guide slot and the second guide slot, various forms of beards can be combed and guided for shaving cleanly by the cutting edges, while the razor and the shaving head have simple structure and is convenient to operate and strongly versatile.

18 Claims, 6 Drawing Sheets

(56) References Cited

U.S. PATENT DOCUMENTS

| | | | | | |
|---|---|---|---|---|---|
| 1,942,911 | A * | 1/1934 | Ashworth | B26B 21/18 30/84 |
| 1,999,941 | A | 4/1935 | McWilliams | |
| 2,359,198 | A * | 9/1944 | Bowers | B26B 21/18 30/32 |
| 2,710,446 | A * | 6/1955 | Seko | B26B 21/18 30/83 |
| 2,715,768 | A * | 8/1955 | Hoberg | B26B 21/18 30/526 |
| 2,720,695 | A * | 10/1955 | Sabiers | B26B 21/08 30/34.05 |
| 2,795,847 | A * | 6/1957 | Arnade | B26B 21/18 30/84 |
| 2016/0075040 | A1 * | 3/2016 | Nordstrom | B26B 21/521 30/81 |
| 2017/0297212 | A1 * | 10/2017 | Nordstrom | B26B 21/185 |

FOREIGN PATENT DOCUMENTS

| | | | |
|---|---|---|---|
| CN | 216543425 | U | 5/2022 |
| FR | 423887 | A | 4/1911 |

* cited by examiner

RAZOR

CROSS-REFERENCE TO RELATED APPLICATIONS

This application claims the priority of Chinese Patent Application No. 202320151764.5, filed on Feb. 3, 2023, the entire contents of which are hereby incorporated by reference.

FIELD OF TECHNOLOGY

The following application relates to the field of personal care products, in particular to a razor.

BACKGROUND

Razors are commonly used household goods, which generally include safety shaver, electric razor and manual razor. A razor is easy to use with good shaving effect, and convenient to carry, so it is of great significance for daily life.

Existing razors perform traditional shaving operations. However, the existing razors only have a good shaving effect on short beards shaving, because when the beards are long and messy, you need to comb and trim the beards first, and then shave through the razor blade to get a good shaving effect, the operation process is cumbersome.

SUMMARY

An aspect relates to a razor which is able to adapt to various forms of beards, able to groom and guide, and obtain better shaving effect by easy operation.

A first aspect of the present application provides a shaving head, which includes a cover body, a base and a blade. The cover body is provided with a cover plate arranged opposite to the base which partially covers the base. a blade slot is formed between the cover plate and the base. The base has at least a first side and a second side exposing outside the blade slot, in which the first side is provided with at least two first comb teeth, and a first guide slot is formed between every two adjacent first comb teeth of the at least two first comb teeth; the second side is provided with at least two second comb teeth, and a second guide slot is formed between every two adjacent second comb teeth of the at least two second comb teeth: the first comb teeth is longer than the second comb teeth: the blade slot receives the blade which has a first cutting edge facing the first side and a second cutting edge facing the second side: the first cutting edge and the second cutting edge are both exposed outside the blade slot but do not extend beyond the first side or second side of the base.

The first guide slot and the second guide slot of the shaving head in accordance with the present application achieve different depths by providing the first comb teeth and the second comb teeth corresponding to the first cutting edge and the second cutting edge with different lengths, in which the first guide slot with a depth adapted to thick, long and messy beards might effectively comb these beards so that the first cutting edge is able to shave them to a shorter state; the second guide slot with a depth adapted to a user's face is able to fit the user's face tightly so that the second cutting edge can shave shorter or initially shaved beards cleanly. Therefore, the first guide slot and the second guide slot might cooperate to comb and guide various forms of hairs for shaving cleanly by the cutting edges, and they have simple structures which are convenient to operate and strongly versatile.

A second aspect of the present application provides a razor comprising a shaving head and a handle. The shaving head includes a cover body, a base and a blade. The cover body is provided with a cover plate arranged opposite to the base which partially covers the base. A blade slot is formed between the cover plate and the base. The base has at least a first side and a second side exposing outside the blade slot, in which the first side is provided with at least two first comb teeth, with a first guide slot formed between the two adjacent first comb teeth: the second side is provided with at least two second comb teeth, with a second guide slot formed between the two adjacent second comb teeth: the first comb teeth is longer than the second comb teeth: the blade slot receives the blade which has a first cutting edge facing the first side and a second cutting edge facing the second side; the first cutting edge and the second cutting edge are both exposed outside the blade slot but do not extend beyond the first side or the second side of the base. One end of the handle is attached to the base of the shaving head.

These and other features, aspects and advantages of the present application will become better understood with reference to the following drawings, description and claims.

BRIEF DESCRIPTION

DETAILED DESCRIPTION

A First Embodiment

Figure 1:
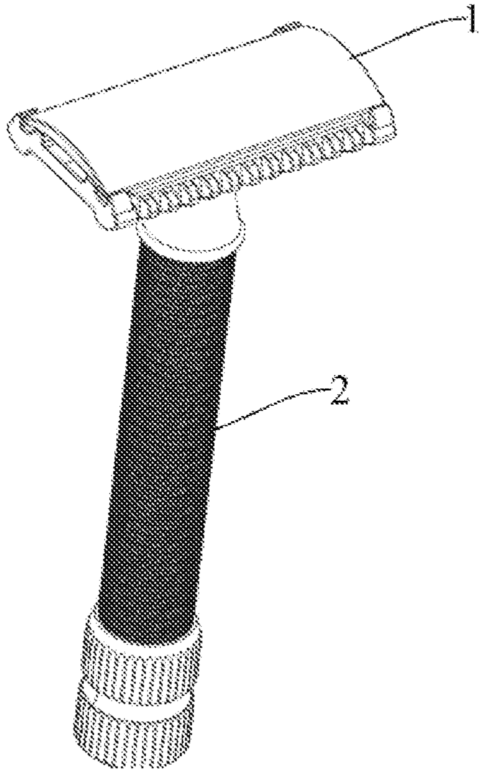
FIG. 1 is a schematic structural view of a razor according to a first embodiment of the present application.

Referring to FIG. 1, a razor in accordance with according to a first embodiment of the present application includes a shaving head 1 and a handle 2, which are attached to each other.

Figure 2:
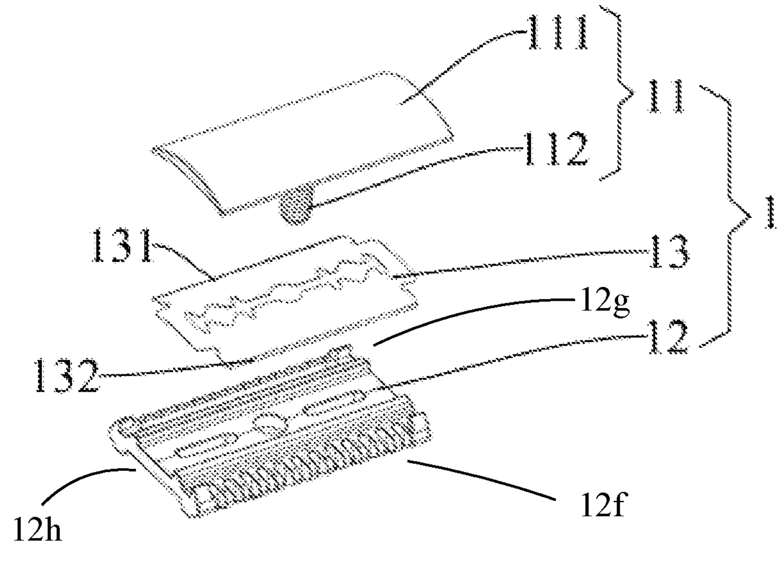
FIG. 2 is an exploded schematic view of a shaving head according to a first embodiment of the present application.

As shown by FIG. 2 which is an exploded schematic view of a shaving head 1, the shaving head 1 includes a cover body 11, a base 12 and a blade 13. The cover body 11 includes a cover plate 111 and a connector 112 arranged on one side of the cover plate 111. The base 12 is provided with a connecting hole 12*a*. The connector 112 of the cover body 11 passes through the connecting hole 12*a* such that the cover plate 111 is arranged on the base 12, and the base 12 has at least a first side 12*f* and a second side 12*g* that are not covered by the cover body 11. Specifically, the part of the base 12 covered by the cover plate 111 is defined as a holding area that a blade slot 12*h* is formed between the cover plate 111 and the holding area. The blade slot 12*h* receives the blade 13 which has a first cutting edge 131 facing the first side 12*f* and a second cutting edge 132 facing the second side 12*g*. The first cutting edge 131 and the second cutting edge 132 are both exposed outside the blade slot 12*h* but do not extend beyond the first side 12*f* or second side 12*g* of the base 12.

Figure 3:
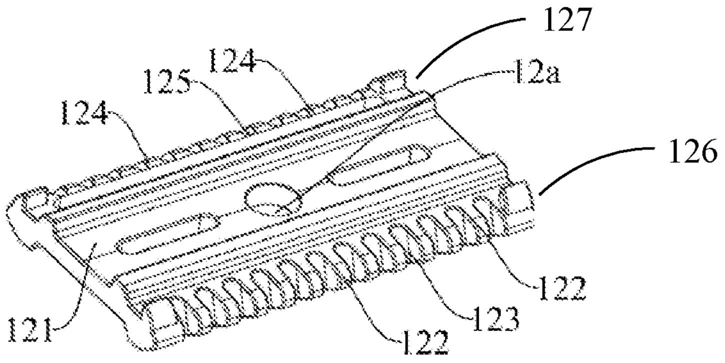
FIG. 3 is a schematic structural view of a base according to a first embodiment of the present application.

Referring to FIG. 3 together which is a schematic structural view of a base, the base 12 includes a carrying plate 121, first comb teeth 122 and second comb teeth 124. The first comb teeth 122 and the second comb teeth 124 are vertically arranged on a first side face 126 and second side face 127 of the carrying plate 121 and at the same time perpendicular to the first cutting edge 131 and the second cutting edge 132 of the blade 13, respectively. The first comb teeth 122, the second comb teeth 124 and the first side face 126 and the second side face 127 of the carrying plate 121 together form the first side 12*f* and the second side 12*g* of the base 12. Every two adjacent comb teeth of the first comb teeth 122 defines a first guide slot 123 and every two adjacent comb teeth of the second comb teeth 124 defines a second guide slot 125. Specifically, the distance between the two adjacent comb teeth defines the width of the guide slot and the length of the comb teeth defines the depth of the guide slot, in which the depth of the first guide slot 123 is greater than the depth of the second guide slot 125. In this regard, when the blade 13 is installed on the base 12, the length of the first cutting edge 131 beyond the root of the first comb teeth 122 is greater than the length of the second cutting edge 132 beyond the root of the second comb teeth 124, i.e., the length of the first cutting edge 131 exposed in the first guide slot 123 is greater than the length of the second cutting edge 132 exposed in the second guide slot 125.

Specifically, the first comb teeth 122 with a longer length can form deeper first guide slots 123 so that longer and denser beards can be combed during the shaving process; and because the first cutting edge 131 is exposed in the first guide slots 123 for a longer length, its edge is more exposed so that it can have a faster and more intense shaving effect: thus using the side of shaving head 1 with the first comb teeth 122 and the first cutting edge 131 in conjunction can shave longer and denser beards faster and get neatly combed shorter beards. While the second comb teeth 124 with a shorter length is more suitable for combing beards of shorter length, and can make the ends of the second guide slots 125 closer to a user's face, so that the distance between the second cutting edge 132 located on the other side of the shaving head land the user's face is shorter in the shaving process, allowing for an effective shaving of short beards; Further, the second cutting edge 132 is exposed in the second guide slots 125 for a shorter length and its edge is less exposed so that a more delicate and soft shaving effect can be obtained. Thus, the user can choose different sides of the shaving head 1 for different results depending on his shaving needs. When the user wants to shave longer and messy beards more thoroughly, he can use the side of the shaving head 1 with the first comb teeth 122 for an initial shave and then switch to the other side with the second comb teeth 124 for a more thorough shave.

Specifically, in this embodiment the spacing between the two adjacent first comb teeth 122 is greater than the spacing between the two adjacent second comb teeth 124, i.e. the width of the first guide slots 123 is greater than the width of the second guide slots 125. This allows the first guide slots 123 to easily accommodate more beards and is more suitable for users having longer thicker beards.

In some embodiments, the first guide slot 123 has a slot depth range of 1.5 mm to 2.0 mm, which may be specifically 1.5 mm, 1.6 mm, 1.7 mm, 1.8 mm, 1.9 mm, 2.0 mm, etc., in one embodiment is 1.7 mm. It will be appreciated that the slot depth range allows the first guide slot 123 to accommodate coarse, messy and longer beards, which is able to provide effective combing and guiding of the coarse or messy or longer beards for an initial shaving of the first cutting edge 131.

In some embodiments, the slot depth range of the second guide slot 125 is from 0.3 mm to 0.6 mm, for example, it may be 0.3 mm, 0.4 mm, 0.5 mm, 0.6 mm, etc., in one embodiment is 0.48 mm. It will be appreciated that the slot depth range allows the second guide slot 125 to guide the shorter beards and fit the user's face tightly, facilitating the second cutting edge 132 to shave the shorter beards for effectively.

Furthermore, the first comb teeth 122 and the second comb teeth 124 have a convex arc structure with a rounded transitional surface, which can effectively avoid scratching the user's facial skin when combing and guiding bears, improving the comfort and safety during use.

It will be appreciated that the guide slots may have different configurations depending on the design of the comb teeth or the carrying plate. For example, in the base shown in FIG. 3, the first and second side faces of the carrying plate 121 are both perpendicular to their respective adjacent faces on the carrying plate, and the first comb teeth 122 and the second comb teeth 124 are arranged perpendicular to the first side face 126 and the second side face 127 respectively, such that the first guide slots 123 and the second guide slots 125 formed therein are parallel to the direction from the cover plate to the base.

Figure 4:
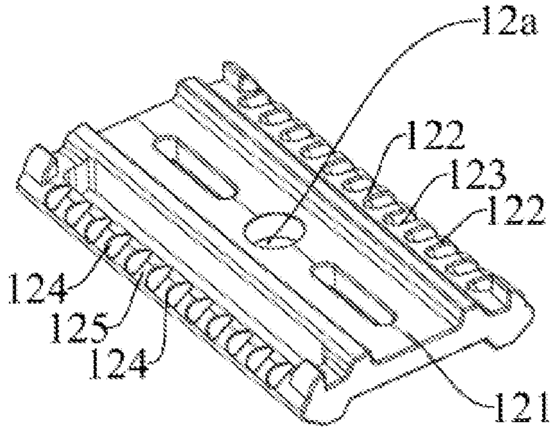
FIG. 4 is a schematic structural view of another base according to a first embodiment of the present application.

Refer to FIG. 4 now, which shows a schematic view of the base in some other embodiments, in which the second side face 127 of the carrying plate 121 is a slope surface, and the end close to the cover body 11 is closer to the second cutting edge 132 than the end away from the cover body 11, so that the second guide slot 125 forms an angle with the direction from the cover plate to the base.

Figure 11:
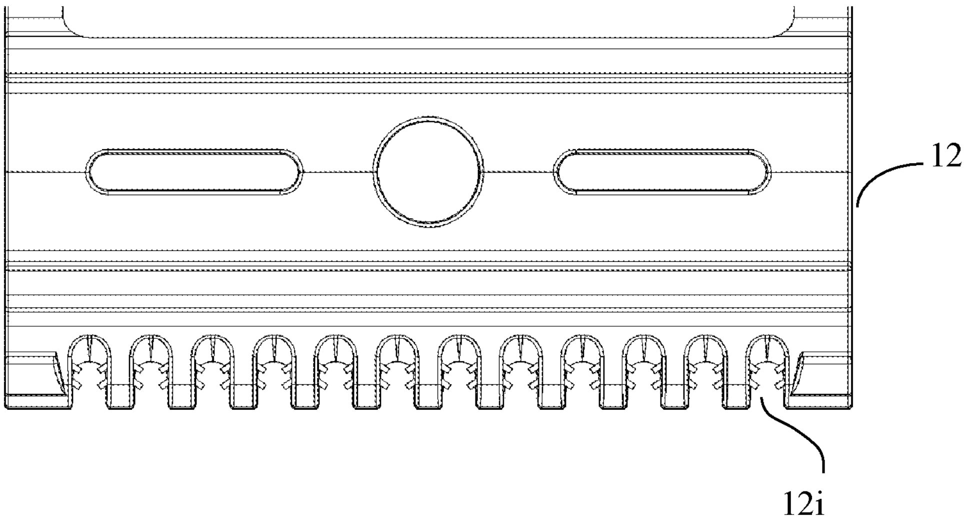
FIG. 11 is a partial view of a base according to a first embodiment of the present application.

Furthermore, refer to FIG. 11, the first comb teeth 122 and the second comb teeth 124 are provided with beard guide sticks 12*i* on the surfaces of the sides thereof facing the guide slots. One end of the beard guide stick is attached to the surface of the comb tooth, the other end with a vector toward the inside of the guide slot and a vector toward the side of the base away from the blade extends towards both the inside of the guide slot and the side of the base away from the blade. The beard guide sticks 12*i* are able to further comb the beards in the guide slots, so as to obtain better results.

Figure 5:
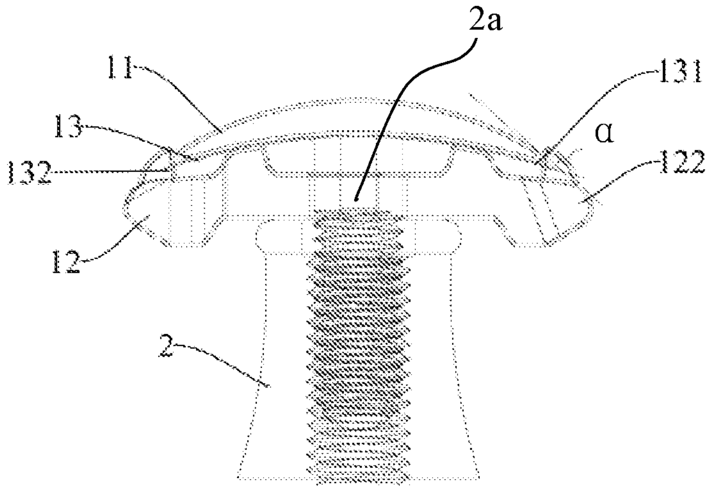
FIG. 5 is a side structural view of a shaving head according to a first embodiment of the present application.

Also referring to FIG. 5, which shows a further embodiment of the shaving head 1, in which the cover body 11 has a convex arc structure curved toward the base 12, so that its edge is rounded with the outer edge of the first comb teeth 122 or the second comb teeth 124 of the base 12, respectively, to effectively avoid scratching the skin in the process of shaving hair, and improve the comfort of using the razor.

Furthermore, the angle $\alpha$ formed between the tangent line between the edge of the cover body 11 near the side of the first cutting edge 131 and the outer edge of the first comb teeth 122 and the extension line of the first cutting edge 131 is 20° to 30°, for example, it may be 20°, 22°, 24°, 26°, 28°, 30°, etc. The angular fit between the cover body 11, the first comb teeth 122 and the first cutting edge 131 enables the cutting angle of the blade 13 to fit more closely to the face and improve the comfort of the shaving process while ensuring combing and guiding of thick, long and messy beards.

The handle 2 is attached to the base 12 of the shaving head 1. Specifically, in this embodiment, one end of the handle 2 is provided with a mounting hole 2*a* matching the connector 112 of the cover body 11. Passing through the connecting hole 12*a* of the base 12, the connector 112 of the cover body 11 is inserted into the mounting hole 2*a* of the handle 2, so that the handle 2 is removably attached to the base 12.

It will be appreciated that in some other embodiments, the shaving head 1 has an integrated cover body 11 and base 12, with a blade slot 12*h* retained between them to receive the blade 13. In this case, the handle 2 may either be integrally formed with the base 12 or may be attached to the base 12 in a detachable form.

A Second Embodiment

This embodiment is a further embodiment of the razor described in the first embodiment.

Figure 6:
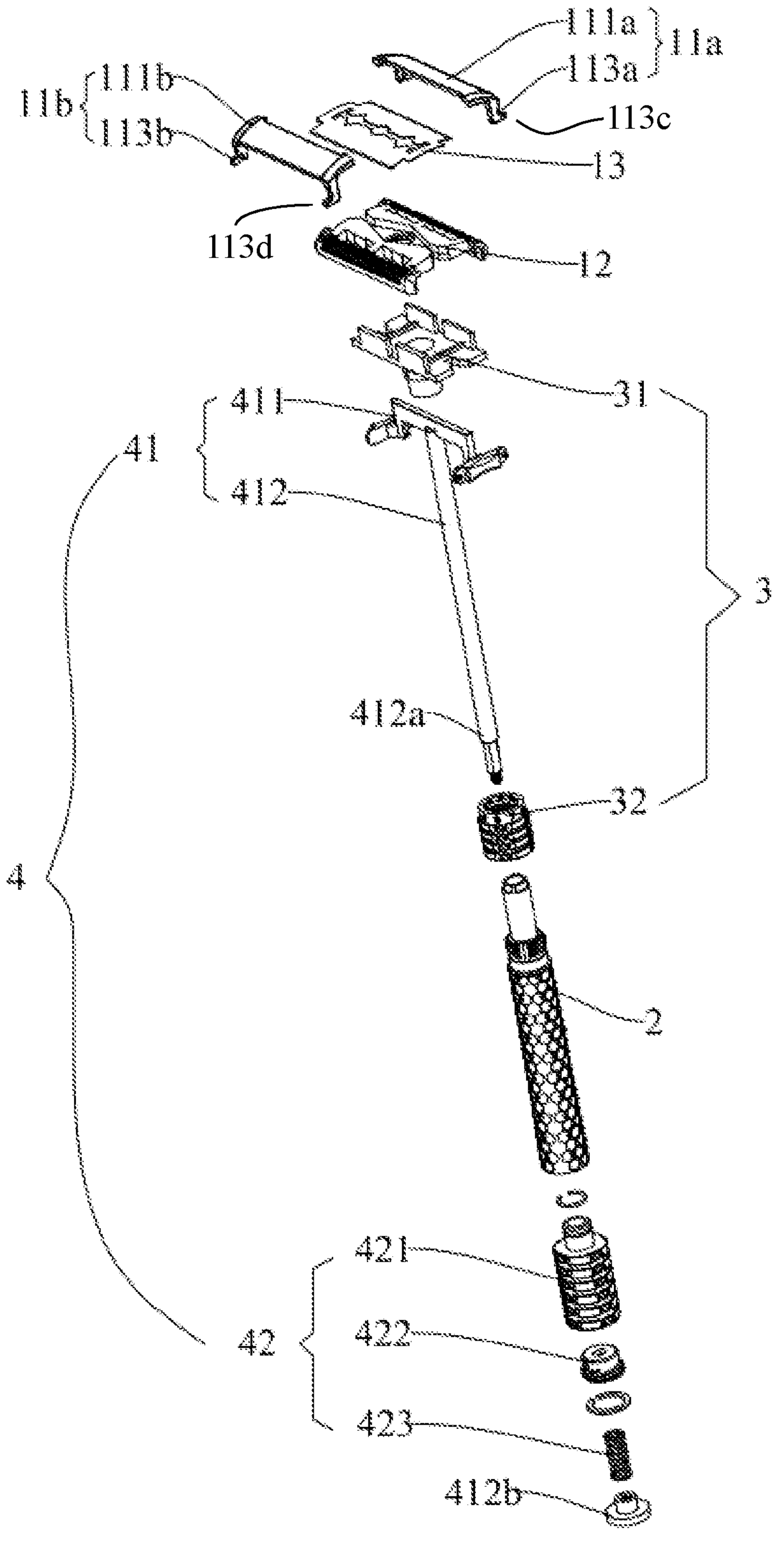
FIG. 6 is an exploded schematic view of a razor according to a second embodiment of the present application.

Refer to FIG. 6, which shows an exploded schematic view of the razor described in this embodiment. The razor further includes a blade adjustment unit 3 and an open-close unit for the cover body 4 for the cover body on the basis of the first embodiment, and accordingly the structures of the shaving head 1 and the handle 2 are improved.

Figure 7:
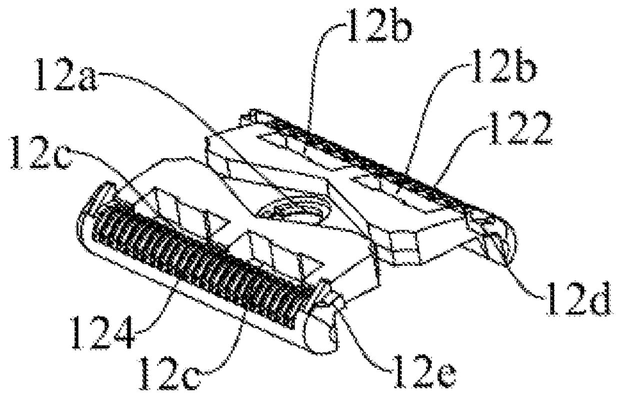
FIG. 7 is a schematic structural view of a base according to a second embodiment of the present application.

Refer to FIG. 7 which is a schematic structural view of a base in this embodiment. Specifically, in this embodiment, the base 12 with a connecting hole 12*a* is further provided with a through-hole 12*b* and a through-hole 12*c* along the first side 12*f* and the second side 12*g*, respectively. In this regard, when installing the blade 13 on the base 12, the first through-hole 12*b* and the second through-hole 12*c* are at least partially covered by the first cutting edge 131 or the second cutting edge 132 of the blade 13, respectively. One end of the handle 2 is snapped in the connecting hole 12*a*.

Figure 8:
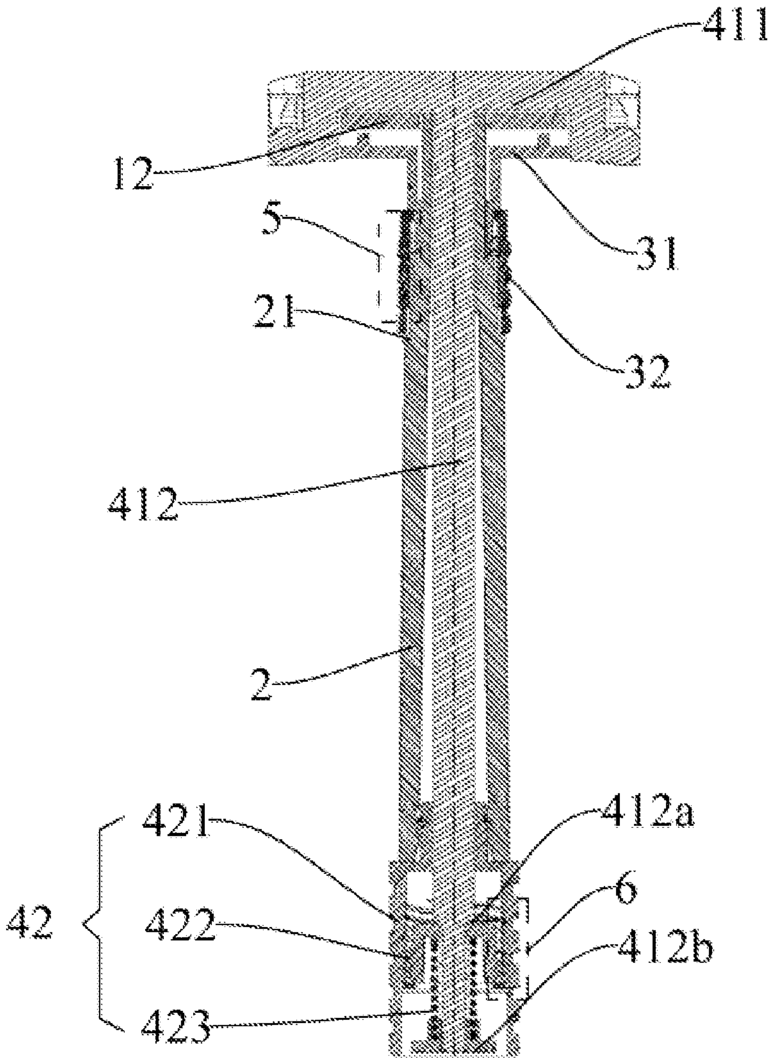
FIG. 8 is a partial sectional view of a razor according to a second embodiment of the present application.

Also referring to FIG. 8, which shows a partial cross-sectional view of the blade adjustment unit 3 and the open-close unit for the cover body 4 installed with the base 12 and the handle 2.

The blade adjustment unit 3 includes an adjustment frame 31 and an auxiliary adjusting mechanism 32.

Figure 9:
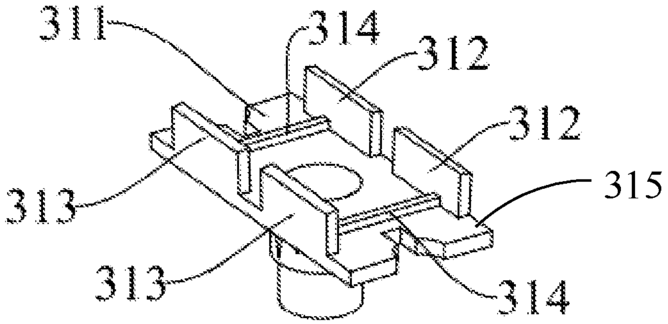
FIG. 9 is a schematic structural view of an adjustment frame according to a second embodiment of the present application.

Also referring to FIG. 9, the adjustment frame 31 includes a bed 311, a first contact block 312 and a second contact block 313. The bed 311 is movably sleeved on an end of the handle 2 near the base 12 and the bed 311 has a first surface 315 facing the base 12. The first contact block 312 and the second contact block 313 are arranged on the first surface 315 of the bed 311, passing through the first through-hole 12*b* or the second through-hole 12*c* of the base 12 and against the inside of the first cutting edge 131 or the second cutting edge 132 of the blade 13, respectively.

The auxiliary adjusting mechanism 32 is used to provide auxiliary adjustment of the position of the adjustment frame 31 on the handle 2. In this embodiment, the auxiliary adjusting mechanism 32 is an adjusting knob 421 sleeved on the handle 2 and against the side of the adjustment frame 31 away from the base 12. A matching first drive thread pair 5 is provided between the knob 421 and the handle 2, turning the adjusting knob 421 along the matching first drive thread pair 5 allows the adjusting knob 421 to be moved up and down along the handle 2.

By controlling the auxiliary adjusting mechanism 32 up and down along the handle 2, the heights of the first contact block 312 and the second contact block 313 through the base 12 are able to adjust so that the distances of the abutted first cutting edge 131 and the second cutting edge 132 to the base 12 are able to adjust and thus the intensity of cutting edges are changed. For example, when the auxiliary adjusting mechanism 32 moves towards the base 12, the adjustment frame 31 is pushed towards the base 12 and the heights of the first contact block 312 and the second contact block 313 through the base 12 increase, causing the first cutting edge 131 and the second cutting edge 132 to be pushed up away from the base 12; and as the distances between the contact blocks and the cover body 11 become smaller, the blade 13 subjected to both forces at the same time decreases its deformation degree which makes its intensity increase, therefore suitable for people with thicker and harder beards. And when the auxiliary adjusting mechanism 32 moves away from the base 12, the adjustment frame 31 will follow the auxiliary adjusting mechanism 32 under the elastic force of the blade 13, so that the heights of the first contact block 312 and the second contact block 313 through the base 12 decrease, and the distances between the first cutting edge 131 and the second cutting edge 132 to the base 12 also decrease accordingly; and as the distances between the contact blocks and the cover body 11 become larger, the deformation degree of the blade 13 also increases, resulting in a less intense and softer blade, suitable for people with finer and softer beards and more sensitive skin.

It will be appreciated that the auxiliary adjusting mechanism 32 is provided to enable the user to adjust the position of the adjustment frame 31 more conveniently and to indirectly achieve adjustment of the distances between the cutting edges and the base 12, as well as its degree of intensity. Therefore, except for the adjusting knob 421 used in this embodiment, in some other embodiments, the auxiliary adjusting mechanism 32 might also achieve the same auxiliary adjustment in other ways. While in some other embodiments, the blade adjustment unit 3 may also include only a contact block, and a user may directly adjust the position of the contact block on the handle 2, thus realizing the adjustment of the cutting edges.

In some embodiments, the adjustment frame 31 includes a plurality of first contact blocks 312 and the second contact blocks 313, which are spaced on the first surface 315 of the bed 311, respectively. Accordingly, the base 12 is also spaced with a corresponding quantity of first through-holes 12*b* and second through-holes 12*c*. The plurality of the first contact blocks 312 and the second contact blocks 313 provide a more even adjustment effect for the blade 13, while the spaced through-holes provide a stronger strength for the base 12.

In some embodiments, the adjusting frame 31 further includes at least one limit block 314, which is arranged on the first surface 315 of the bed 311 with a height less than the heights of the first contact block 312 and the second contact block 313, and the difference between the heights of the first contact block 312 or second contact block 313 and the limit block 314 is less than the height of the blade slot 12*h*. The limit block 314 abuts against the base 12 when the adjustment frame 31 with the limit block 314 moves towards the base 12, so as to prevent the first contact block 312 or second contact block 313 passing through the through-holes for a length too much to damage to the blade 13.

In some embodiments, the limit block 314 is arranged between the first contact block 312 and the second contact block 313 and attached to both. It can provide further support for the first contact block 312 and the second contact block 313, in addition to play a limiting role. For the adjustment frame 31 including a plurality of first contact blocks 312 and the second contact blocks 313, a plurality of limit blocks 314 might also be provided accordingly, so that each first block 312 and second block 313 can obtain sufficient support, and the adjustment frame 31 has a better overall strength.

In some embodiments, in order to prevent the blade adjustment unit 3 from moving too far away the base 12 and disengaging the first contact block 312 and the second contact block 313 from the base 12, the handle 2 is further provided with a first limit part 21 for limiting the blade adjustment unit 3. In this embodiment, the first limit part 21 is a bump arranged on the outside of the handle 2, with a distance from the base 12 less than the overall length of the blade adjustment unit 3. The first limit part 21 defines the maximum distance that the blade adjustment unit 3 can move away from the base 12, thus avoiding the situation where the first contact block 312 and the second contact block 313 are detached from the base 12 due to excessive movement.

Figure 10:
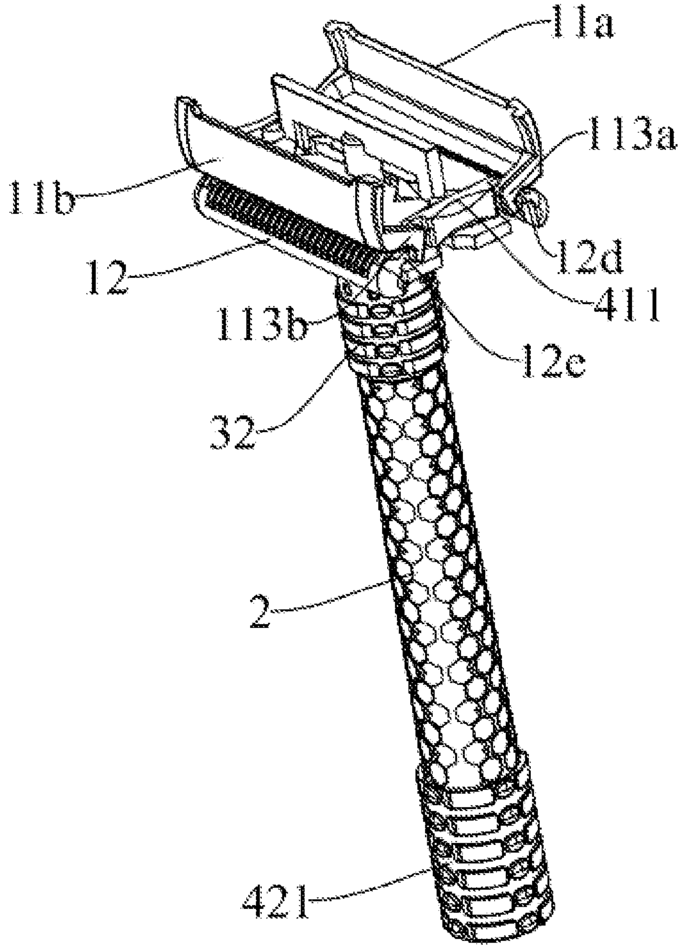
FIG. 10 is a schematic structural view of an open-close unit for a cover body according to a second embodiment of the present application, which is in an open state.

Referring to FIGS. 6 and 8, the open-close unit for the cover body 4 includes a drive member 41 and a control assembly 42. And FIG. 10 shows a schematic structural view of the open-close unit for the cover body 4 in which the cover body 11 is open.

The drive member 41 includes a connecting rod 412 and a hinge joint 411, one end of the connecting rod 412 attached to the hinge joint 411 and the other end of the connecting rod 412 passing through the connecting hole 12*a* in the base 12 and penetrating the handle 2. In this regard, the hinge joint 411 is unable to pass through the connecting hole 12*a*, as when the connecting rod 412 moves from the base 12 toward the handle 2, the hinge joint 411 is stuck on the side of the base 12 away from the handle 2.

Accordingly, the cover body 11 is arranged in a form with divided parts, which includes a first sub-cover 11*a* and a second sub-cover 11*b* arranged side by side, the first sub-cover 11*a* including a first sub-cover plate 111*a* and a first connecting arm 113*a*, the second sub-cover 11*b* including a second sub-cover plate 111*b* and a second connecting arm 113*b*, the first connecting arm 113*a* and the second connecting arm 113*b* respectively arranged on the sides of the first sub-cover plate 111*a* and the second sub-cover plate 111*b* near the base 12. In this regard, the first connecting arm 113*a* and the second connecting arm 113*b* are respectively rotatably attached to the hinge joint 411, both of which rotate around the hinge joint 411 in opposite directions to bring the first and second sub-cover plates 111*a* and 111*b* together, or separate the sub-cover plate 111*a* and the second sub-cover plate 111*b* from each other. In addition, the base 12 is provided with a first limit element 12*d* and a second limit element 12*e*, both of which are able to restrict the first connecting arm 113*a* and the second connecting arm 113*b*, respectively, thereby limiting their moving paths.

Specifically, in this embodiment, the first limit element 12*d* and the second limit element 12*e* of the base 12 are hooks arranged respectively on opposite sides of the carrying plate 121 and protruding towards each other. And the end of the first connecting arm 113*a* of the first sub-cover 11*a* away from the first sub-cover plate 111*a* is bent to form a first limit hook 113*c*; and the end of the second connecting arm 113*b* of the second sub-cover 11*b* away from the second sub-cover plate 111*b* is bent to form a second limit hook 113*d*. The first limit hook 113*c* and the second limit hook 113*d* extend in opposite directions after respectively attached to the hinge joint 411. The first limit hook 113*c* and the second limit hook 113*d* are oriented in opposite directions and are hooked by the first limit element 12*d* and the second limit element 12*e* respectively, after the first sub-cover 11*a* and the second sub-cover 11*b* are assembled to the base 12. The hinge joint 411 of the drive member 41 is attached to the bending parts of the first limit hook 113*c* and the second limit hook 113*d*, respectively.

Thereby, when the drive member 41 moves along the handle 2 towards the base 12, the connection part of the first connecting arm 113*a* and the second connecting arm 113*b* with the hinge joint 411 will follow the movement of the drive member 41 and move away from the base 12, and at the same time, the first connecting arm 113*a* and the second connecting arm 113*b* are unable to leave the base 12 as a whole due to the hooking of the first limit element 12*d* or second limit element 12*e*, but able to only rotate around the first limit element 12*d* or second limit element 12*e* and drive the first sub-cover 11*a* and the second sub-cover 11*b* to rotate around the hinge joint 411 in opposite directions and move away from each other to separate the first sub-cover plate 111*a* and the second sub-cover plate 111*b* to open the cover body. And when the drive member 41 moves in the opposite direction, the connection points of the first connecting arm 113*a* and the second connecting arm 113*b* with the hinge joint 411 will follow the drive member 41 to move closer to the base 12, while the two connecting arms are only able to rotate around the first limit element 12*d* or the second limit element 12*e* due to the hooking of the first limit element 12*d* or second limit element 12*e* and drive the first sub-cover 11*a* and the second sub-cover 11*b* to rotate around the hinge joint 411 in opposite directions different from previous directions and move towards each other to bring the first sub-cover plate 111*a* and the second sub-cover plate 111*b* together to close the cover body.

It will be appreciated that the limit elements serve to limit the way in which the connecting arms are unable to move to detach from the base 12 as a whole and thus limit its movement. For example, in some other embodiments, the connecting arm may be hinged to both the limit elements of the base 12 and the connecting part of the drive member 41, which may also achieve the above effect.

Alternatively, in some other embodiments, the cover body 11 may be a single unit without being divided into a first sub-cover 11*a* and a second sub-cover 11*b*, which includes a cover plate and a connecting arm, in which the connecting arm is arranged on the side of the cover plate near the base and is pivotally attached to an articulated portion of the drive member. Correspondingly, the base is provided with a limit element for restraining the connecting arm. Thereby, when the drive member moves up and down along the handle, the cover body will rotate around the articulated portion to open or close along one side of the base.

The control assembly 42 includes a knob 421 and an internal rotating block 422, in which the knob 421 is attached to the end of the handle 2 away from the base 12 and is rotatable about the handle 2. The internal rotating block 422 is snapped on the connecting rod 412 of the drive member 41 and is arranged inside the knob 421. In this regard, the inner side of the knob 421 and the outer side of the internal rotation block 422 are provided with a matching second drive thread pair 6. With the cooperation of the second drive thread pair 6, the internal rotating block 422 is able to move up and down within the knob 421 by simply turning the knob 421, thus driving the connecting rod 412 to move relative to the handle 2 and realize the opening and closing of the cover body 11.

In some embodiments, the knob 421 is attached to the end of the handle 2 by means of a snap spring. In other embodiments, the knob 421 may also be otherwise attached to the handle 2 as long as it is rotatable around the handle 2 and will not detach from the handle 2. In some embodiments, the internal rotating block 422 is also snap-fitted within the knob 421 by means of a snap spring, which effectively prevents the internal rotating block 422 from detaching from the knob 421.

In some embodiments, the control assembly 42 further includes a top tightening member 423, and the connecting rod 412 is provided with a first stuck element 412*a* and a second stuck element 412*b*, in which the internal rotating block 422 is arranged between the first stuck element 412*a* and the second stuck element 412*b*, and the top tightening member 423 is arranged between the internal rotating block 422 and the second stuck element 412*b* and fastens the internal rotating block 422 to the first stuck element 412*a*, thereby enabling the internal rotating block 422 to be stuck on the connecting rod 412. Specifically, the top tightening member 423 might be an elastic part in compression state, which able to exert continuous pressure on the internal rotating block 422 and tighten it to the first stuck element 412*a*, so that the internal rotating block 422 needs to overcome more resistance to be rotated, which able to avoid a user to open the cover body 11 by mistake. In some embodiments, the second stuck element 412*b* may be detachably arranged on the connecting rod 412 so that a user can conveniently disassemble, replace parts and reassemble the razor as a whole.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

What is claimed:

1. A shaving head, wherein the shaving head comprises a cover body, a base, a blade and a blade adjustment unit; the cover body is provided with a cover plate arranged opposite to the base and partially covering the base, a blade slot is formed between the cover plate and the base; the base has at least a first side and a second side exposing outside the blade slot, wherein the first side is provided with at least two first comb teeth, and a first guide slot is formed between every two adjacent first comb teeth of the at least two first comb teeth; the second side is provided with at least two second comb teeth, and a second guide slot is formed between every two adjacent second comb teeth of the at least two second comb teeth; the first comb teeth is longer than the second comb teeth;

the blade slot receives the blade which has a first cutting edge facing the first side and a second cutting edge facing the second side; the first cutting edge and the second cutting edge are both exposed outside the blade slot but do not extend beyond the first side or second side of the base;

the base is further provided with at least one through-hole, and at least along one of the first side or the second side is arranged with the at least one through-hole which is at least partially covered by the first cutting edge and/or the second cutting edge respectively when the blade slot receives the blade;

the blade adjustment unit comprises an adjustment frame, comprising a bed and a contact block, wherein the bed has a first surface facing the base; the contact block is arranged on the first surface of the bed, passing through the through-hole and against the inside of the first and/or second cutting edge of the blade; the adjustment frame is movable to adjust the height of the contact block through the base.

2. The shaving head of claim 1, wherein the first cutting edge of the blade extends beyond the root of the first comb teeth by a greater length than the second cutting edge extends beyond the root of the second comb teeth.

3. The shaving head of claim 1, wherein the first guide slot has a slot depth range of 1.5 mm to 2.0 mm, and/or, the second guide slot has a slot depth range of 0.3 mm to 0.6 mm.

4. The shaving head of claim 1, wherein the first comb teeth and/or the second comb teeth have a convex arc structure.

5. The shaving head of claim 1, wherein the angle formed between the tangent line between the edge of side of the cover body near the first cutting edge and the outer edge of the first comb teeth and the extension line of the first cutting edge is 20° to 30°.

6. The shaving head of claim 1, wherein the first comb tooth is provided with a beard guide stick on the surface of the side thereof facing the first guide slot, wherein one end of the beard guide stick is attached to the surface of the first comb tooth and the other end extends towards both the inside of the first guide slot and the side of the base away from the blade; and/or the second comb tooth is provided with a beard guide stick on the surface of the side thereof facing the second guide slot, wherein one end of the beard guides stick is attached to the surface of the second comb tooth and the other end extends towards both the inside of the second guide slot and the side of the base away from the blade.

7. A razor, wherein the razor comprises a shaving head and a handle, the shaving head comprising a cover body, a base, a blade and a blade adjustment unit; the cover body is provided with a cover plate arranged opposite to the base and partially covering the base, a blade slot is formed between the cover plate and the base; the base has at least a first side and a second side exposing outside the blade slot, wherein the first side is provided with at least two first comb teeth, and a first guide slot is formed between every two adjacent first comb teeth of the at least two first comb teeth; the second side is provided with at least two second comb teeth, and a second guide slot is formed between every two adjacent second comb teeth of the at least two second comb teeth; the first comb teeth is longer than the second comb teeth;

the blade slot receives the blade which has a first cutting edge facing the first side and a second cutting edge facing the second side; the first cutting edge and the second cutting edge are both exposed outside the blade slot but do not extend beyond the first side or the second side of the base;

the base is further provided with at least one through-hole, and at least along one of the first side or the second side is arranged with the at least one through-hole which is at least partially covered by the first cutting edge and/or the second cutting edge respectively when the blade slot receives the blade;

the blade adjustment unit comprises an adjustment frame, comprising a bed and a contact block, wherein the bed is sleeved on the handle and the bed has a first surface facing the base;

the contact block is arranged on the first surface of the bed, passing through the through-hole and against the inside of the first and/or second cutting edge of the blade; the adjustment frame is movable along the handle;

one end of the handle is attached to the base of the shaving head.

8. The razor of claim 7, wherein the first cutting edge of the blade extends beyond the root of the first comb teeth by a greater length than the second cutting edge extends beyond the root of the second comb teeth.

9. The razor of claim 8, wherein the angle formed between the tangent line between the edge of the cover body near the side of the first cutting edge and the outer edge of the first comb teeth and the extension line of the first cutting edge is 20° to 30°.

10. The razor of claim 7, wherein the base is further provided with a first through-hole and a second through-hole along the first side and the second side respectively; the contact block comprises a first contact block and a second contact block, which pass through the first through-hole and the second through-hole respectively and press against the inside of the first cutting edge and the second cutting edge of the blade.

11. The razor of claim 10, wherein the adjustment frame further comprises a limit block which limits the maximum length of the contact block through the through-hole to less than the height of the blade slot.

12. The razor of claim 11, wherein the adjustment frame further satisfies one or more of the following conditions:

there are at least two of the first contact blocks which are spaced on the first surface of the bed, and there are the first through-holes of the same quantity as the first contact blocks which are spaced on the base;

there are at least two of the second contact blocks which are spaced on the first surface of the bed, and there are the second through-holes of the same quantity as the second contact blocks which are spaced on the base;

there are at least two the limit blocks which are spaced on the first surface of the bed.

13. The razor of claim 12, wherein the adjustment frame further comprises an auxiliary adjusting mechanism sleeved on the handle and arranged on the side of the adjustment frame away from the base; changing the position of the auxiliary adjusting mechanism on the handle is able to change the length of the contact block through the through-hole.

14. The razor of claim 13, wherein a matching first drive thread pair provided at the contact face of the auxiliary adjusting mechanism with the handle, the auxiliary adjusting mechanism abuts against the adjustment frame, and rotation of the auxiliary adjusting mechanism is able to change the position of the auxiliary adjusting mechanism on the handle and change the length of the contact block through the through-hole.

15. The razor of claim 9, wherein the base is further provided with a connecting hole snapping one end of the handle;

an open-close unit for the cover body is further provided with a drive member having a connecting rod and a hinge joint, one end of the connecting rod attached to the hinge joint and the other end of the connecting rod penetrating the connecting hole in the base and passing through the handle; the hinge joint is attached to the cover body; thus the drive member is able to move along the handle to control the open and close of the cover body on the base.

16. The razor of claim 15, wherein the cover body further comprises a connecting arm, which is arranged on one side of the cover plate facing the base and is pivotally attached to the hinge joint; the base is further provided with a limit element, which limits the movement of the connecting arm in such a manner that the cover body is able to pivot about the hinge joint as the drive member moves along the handle.

17. The razor of claim 16, wherein the open-close unit for the cover body further comprise a control assembly having a knob and an internal rotating block; the internal rotating block is arranged within the knob and abuts against the connecting rod of the drive member; the inside of the knob and the outside of the internal rotating block are provided with a matching second drive thread pair such that turning the knob moves the internal rotating block and drives the drive member to move along the handle.

18. The razor of claim 17, wherein the control assembly further comprises a top tightening member, the end of the connecting rod away from the hinge joint is successively provided with a first stuck element and a second stuck element, the internal rotation block is arranged between the first stuck element and the second stuck element, and the top tightening member is arranged between the internal rotation block and the second stuck element and applies a force to the internal rotation block towards the first stuck element.

* * * * *